Figures 13, 14:
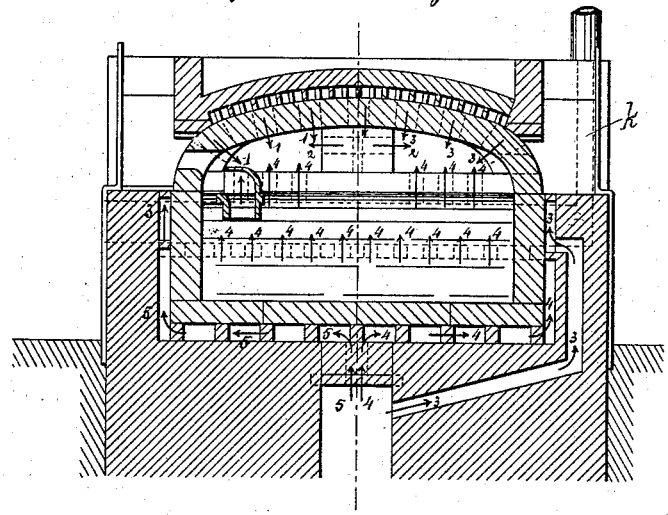

(No Model.) 3 Sheets—Sheet 1.
H. QUENNEC.
FURNACE FOR MELTING GLASS AND APPARATUS CONNECTED THEREWITH.
No. 263,059. Patented Aug. 22, 1882.
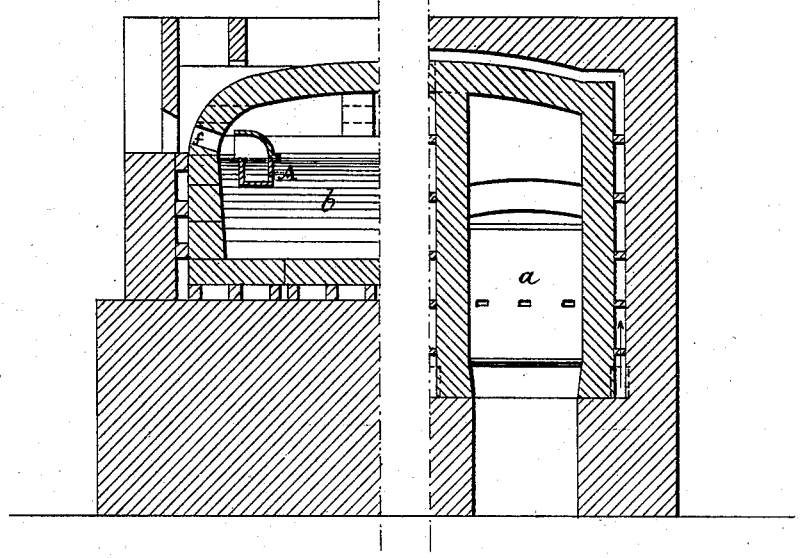
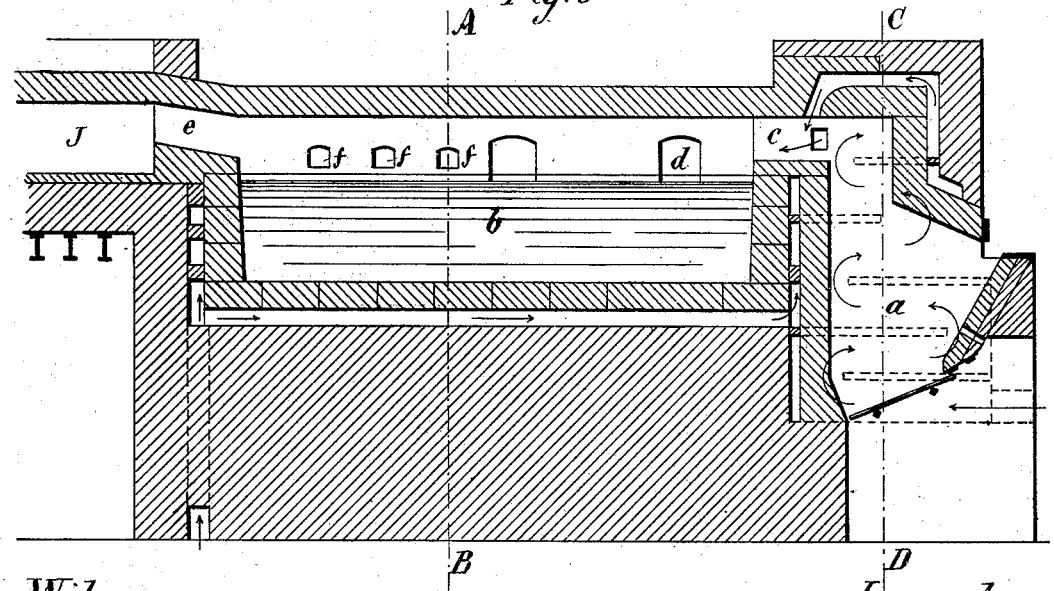
Witnesses  Inventor

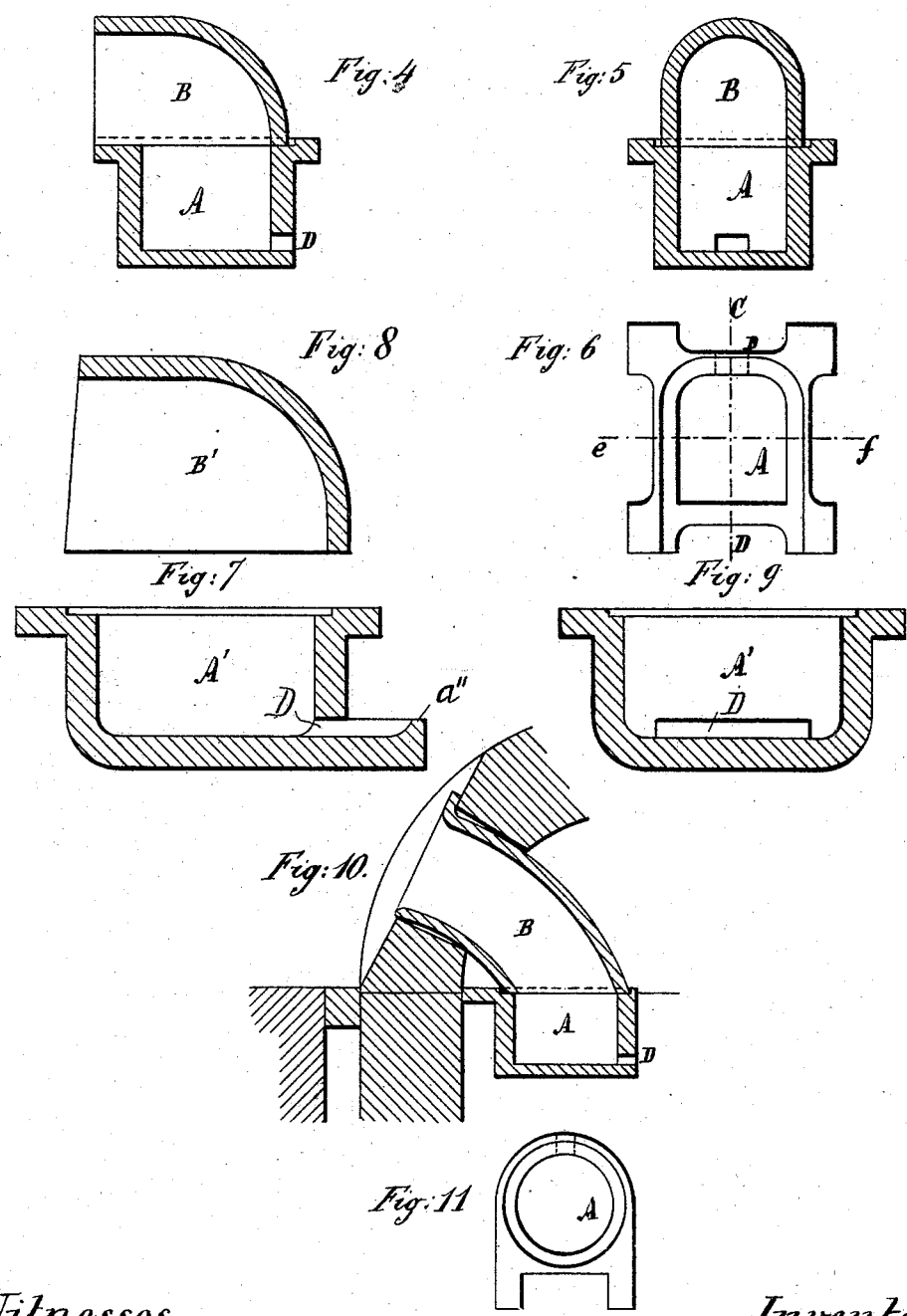

(No Model.) 3 Sheets—Sheet 3.

H. QUENNEC.
FURNACE FOR MELTING GLASS AND APPARATUS CONNECTED THEREWITH.

No. 263,059. Patented Aug. 22, 1882.

Witnesses  Inventor

United States Patent Office.

HENRI QUENNEC, OF PARIS, FRANCE.

FURNACE FOR MELTING GLASS, AND APPARATUS CONNECTED THEREWITH.

SPECIFICATION forming part of Letters Patent No. 263,059, dated August 22, 1882.

Application filed April 15, 1882. (No model.) Patented in France June 9, 1880, No. 137,166; in Belgium June 11, 1880, No. 51,740; in Italy August 28, 1880, No. 207, and in Spain September 2, 1880, No. 1,033.

*To all whom it may concern:*

Be it known that I, HENRI QUENNEC, of Paris, in the Republic of France, have invented a certain new and useful Improvement in Furnaces for Melting Glass, and Apparatus Connected Therewith, of which the following specification is a full description.

This invention relates to the melting and working of glass in a continuous manner in a basin or tank, and has for its object mainly, first, to enable an ordinary fire discharging directly into the tank-chambers to be used for heating without requiring special generators of gaseous fuel; second, to keep cool the walls of the basin and utilize the heat abstracted therefrom for effecting the combustion of the products from said fire, and, third, to enable the melted glass to be collected in a uniform condition.

The fire-chamber, of ordinary construction, is placed at one end of the basin or tank, (in which the melting and working or refining of the glass take place,) and the flames, as they pass over the bridge-wall into the basin, are supplied with hot air from flues in the walls of the basin and of the fire-chamber. The frit or composition to be melted is placed in the basin at the end adjacent to the fire-chamber, and is collected in a refined condition at the opposite end from pots which float in the molten glass and are supplied from below the surface of the glass. These pots constitute an important feature of invention, and may be used in furnaces heated by any known or suitable system. When an ordinary fire is used for heating the contents of the collecting-pots are protected by hoods or covers from the ashes and other foreign matters which may be carried over with the flames. There are also special constructions which improve the operation of the furnace, and will be hereinafter described.

By the present invention the following among other advantages are secured:

First. The costly regenerators or recoverers of heat, which are a source of difficulty in operation, are or may be dispensed with, the air being heated in the walls of the fire-chamber and glass-basin. By this heating, also, the basin-walls are kept cool, and thereby the danger of injury to or loss of said basin is much diminished.

Second. The plant is much simplified, and a very regular working is secured without the difficulties inherent in the valve-distribution of other systems.

Third. The expense of the works is lessened.

Fourth. The necessity for repairs is rendered less frequent, and, when necessary, can be made more readily and cheaply.

Fifth. It is possible to dispense with a special generator of gaseous fuel and use the ordinary open fire, and to work the glass continuously by means of the floating pots, the covers or hoods of said pots protecting their contents from the flame and ashes when the fire is raked or stirred.

Sixth. By means of the floating pots it is possible to have always a glass perfectly refined without scum, to take out the glass from a single point, and to supply the workers a homogeneous glass, the floating pots being kept at a suitable distance from the side walls in the hot glass.

In order that those skilled in the art may be able to make and use the invention, the manner in which the same is or may be carried into effect will now be described with the aid of the accompanying drawings, which form a part of this specification.

Figure 12:
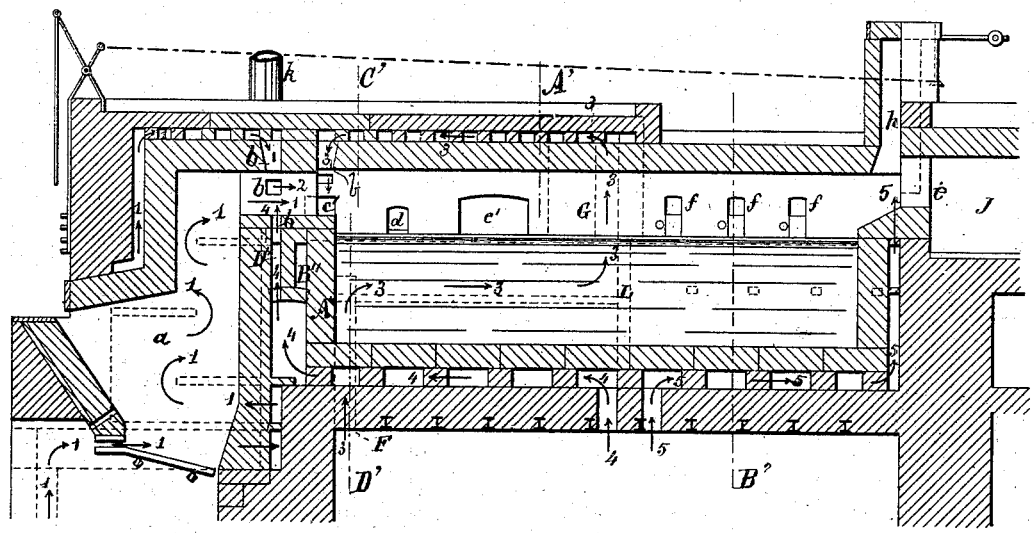

Figures 1, 2, and 3 are sectional views of a glass-furnace constructed in accordance with this invention, Fig. 3 being a vertical longitudinal section and Figs. 1 and 2 cross-sections (half) on lines A B and C D, Fig. 3, respectively. Figs. 4, 5, and 6 illustrate the construction of one of the floating pots with its cover or hood, Figs. 4 and 5 being sections on lines C D and *e f*, Fig. 6, respectively; and Fig. 6, a plan of the pot with the cover or hood removed. Figs. 7, 8, and 9 represent another form of floating pot, and so also Figs. 10 and 11. Figs. 12, 13, and 14 are views of a furnace embodying certain improvements not shown in Figs. 1, 2, and 3. Fig. 13 is a cross-section (half) on line A' B', Fig. 12, and Fig. 14 a similar view on line C' D'.

Referring to Figs. 1, 2, and 3, the products of combustion from the fire-chamber or fire-chambers *a* on each side a central partition-wall pass over the bridge-wall into the basin-chamber *b*, and thence through the outlets *e* into the calcining or fritting chamber J. As the said products pass over the bridge-wall at c they are mixed with air which has circulated through the flues in the side, end, and bottom walls of the basin, and by reducing the temperature of the basin-walls has become itself heated to a high degree, so that it unites with and consumes the combustible gases from the fire-chamber. Hot air is also delivered into the space c from the flues in the walls of the fire chamber or chambers a and in the partition between the fire-chambers.

The frit or material to be melted is introduced at d. The melted and refined glass is withdrawn through the openings f from the interior of the floating pots A. These pots (see Figs. 4, 5, and 6) are provided at the bottom with inlet-openings D, through which the molten glass flows in as fast as it is removed. The supply of glass is thus obtained from below the surface of the molten mass. The pots are protected by detachable hoods or covers B, which are adapted to allow the introduction of the proper implements. The material, therefore, which is introduced at d, after being melted and exposed for a time to the action of the flames, finds its way into one of the pots A, and is removed in a refined condition through one of the openings f.

The pot A' (shown in Figs. 7 and 9) is provided with a plate, a'', forming an extension of the bottom or the side of the inlet-opening D. The object of this extension is to prevent the cooler glass at the bottom of the basin from flowing into the pot, as the admixture of it with the hot glass is liable to cause flaws or blemishes in the manufactured articles. The hood of this pot, which does not extend so far forward as that shown in Figs. 4 and 5, is indicated by B', Fig. 8.

Both forms of pots thus far described allow the flames to enter or the heat to be radiated or reflected into them, so that a small quantity of scum is produced. This scum is hurtful in some kinds of glass—white or window glass, for example—and in working such glass the cover B is adapted to extend through the wall, as shown in Fig. 10. The shape of the pot in plan is represented in Fig. 11.

If it is desired to work two kinds of glass in the one furnace, the basin b may be divided longitudinally.

The additional improvements shown in Figs. 12, 13, and 14 will now be described.

In the bridge-wall, back of the end wall, A'', of basin, is placed a transverse flue, B'', (shown in dotted lines, Figs. 13 and 14,) which flue is open to the air at one end (to the left in the drawings) and at the other is connected with a chimney or uptake, k, so that a current of air is maintained, the said current keeping at a low temperature the basin-wall most exposed to the heat and the attack of the composition in the basin. The arch of the basin is at the furnace end provided with air-circulating flues which open into the space above the bridge-wall. The air is admitted into these flues at F and passes through the horizontal and vertical flues G. The arrows 3 indicate the flow of the current.

At or about the middle of the glass-basin is a partition, L, which divides the flues in the side walls and bottom into two parts, the current on one side flowing with the arrows 4 into the space above the bridge-wall and that on the other with the arrows 5. The object of this division of the flues is to enable the walls at the working end of the basin (right-hand end, Fig. 12) to be kept at a more elevated position than at the furnace end. Except in the case of an extreme rise of temperature, the flow through the flues 5 is cut off or is made small. The air in the flues in the walls of the fire-chamber flows in the direction of the arrows 1 2, and, with that from the flues surrounding the basin, is discharged through the openings b into the space above the bridge-wall.

At h is a chimney or uptake provided with a cover, which is raised by a lever at the front of the furnace when the fire is stoked.

At c' is an opening for facilitating repairs.

At e' is an opening for inserting the collecting-pots. When the walls of the working part of the basin are kept at a sufficiently high temperature the pot may be bottomless, as shown in Fig. 13. It is kept at a determined distance from the basin-wall by the projections m n.

In the pots shown in other figures the lips or projections on the side may be relied upon to keep the pots away from the wall of the basin. These lips or projections also serve to impart greater steadiness or stability to the pots.

It is obvious that modifications may be made in the details of construction without departing from the spirit of the invention, and that portions of the invention may be used without the others.

Having now described my said invention and the manner of carrying the same into effect, what I claim is—

1. The combination, in a glass-furnace, of the basin provided with flues in the side walls and bottom thereof, and the fire-chamber, also provided with flues in its individual walls, both sets of flues delivering the heated air into the space above the bridge-wall, substantially as described.

2. The combination of the basin, the fire-chamber delivering the products of combustion directly thereinto, and one or more floating pots provided with hoods or covers, substantially as described.

3. A floating pot, substantially as described, provided with an inlet for the molten glass, having its lower edge on a level with the upper surface of the bottom of the pot.

4. A floating pot provided with an inlet at the bottom and an extension on the side of said inlet, substantially as described.

5. A pot of the character specified, adapted to float in the molten glass, and provided with a detachable cover or hood of the form shown and described, substantially as described.

6. In a glass-furnace having the inlet for the flames at one end and an outlet for the products of combustion at the other, a basin or tank, the basin provided with two sets of flues in the walls thereof at opposite ends of the basin, substantially as described.

7. In a glass-furnace, the basin provided with flues in the crown or arch above it and also in the walls, both sets of flues delivering the hot air into the space above the bridge-wall, substantially as described.

8. The basin provided, in addition to the flues in the walls, arranged to deliver heated air into the products of combustion from the fire-chamber, with a transverse flue delivering into a chimney or uptake, and arranged directly behind the end wall of the basin adjacent to the fire-chamber, substantially as described.

9. The combination of the fire-chamber, basin, and special chimney or uptake at the point of exit of the gases from the basin, substantially as described.

10. In a glass-furnace, the basin having the inlet for the flame and hot gases at one end and the outlet therefor at the opposite, and provided with an opening for introducing the frit at the inlet end, and working-holes at or near the outlet end, substantially as described.

In testimony whereof I have signed my name to this specification before two subscribing witnesses.

H. QUENNEC.

Witnesses:
 ROBT. M. HOOPER,
 AUG. VINET.